3,597,489
MANUFACTURE OF NAPHTHENIC HYDROCARBONS BY HYDROGENATION OF THE CORRESPONDING AROMATIC HYDROCARBONS
Quang Dang Vu, Paris, and Robert Odello, Montesson, France, assignors to Institut Francais du Petrole, des Carburants et Lubrifiants, Malmaison, Hauts-de-Seine, France
Filed Feb. 24, 1969, Ser. No. 801,333
Claims priority, application France, Feb. 29, 1968, 141,903
Int. Cl. C07c 5/10
U.S. Cl. 260—667    7 Claims

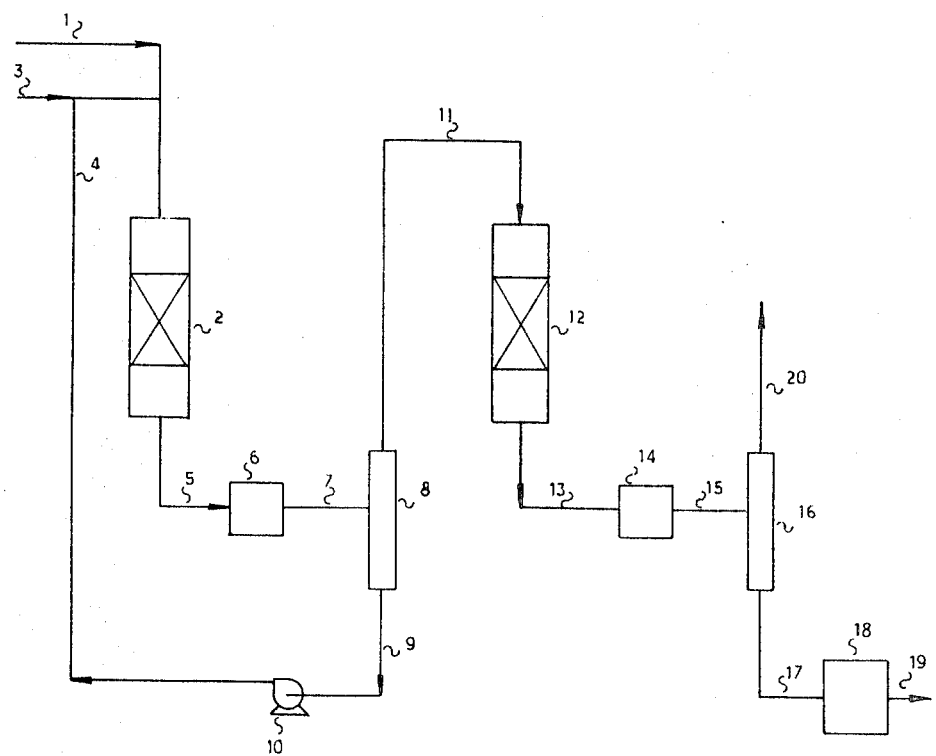

ABSTRACT OF THE DISCLOSURE

For producing cyclohexane or methylcyclohexane from benzene or toluene respectively, a process is provided comprising introducing all of the aromatic hydrocarbon into a first zone in the form of a liquid mixture containing:
 (a) said aromatic hydrocarbon and
 (b) a recycle liquid fraction of the products resulting from the first hydrogenation zone; passing molecular hydrogen into said first zone and conducting the hydrogenation in said first zone at between 140 and 300° C. and at a pressure of between 10 and 70 kg./cm.$^2$ in contact with a fixed bed hydrogenation catalyst;
  cooling resultant gaseous effluent from said first zone to a temperature between 140 and 200° C., to condense 30 to 75% by weight of the hydrocarbon vapors contained therein;
  separating the resulting liquid and vapor phases;
  recycling at least a part of said resulting liquid phase to said first zone as said recycle liquid fraction, and passing at least a part of said resulting vapor phase through a following second hydrogenation zone and conducting the hydrogenation in said second zone in the gas phase at a temperature between 140 and 300° C. and at a pressure between 10 and 70 kg./cm.$^2$, in contact with a fixed bed of hydrogenation catalyst.

---

This invention relates to the manufacture of naphthenic hydrocarbons and more particularly cyclohexane by hydrogenation of the corresponding aromatic hydrocarbons, particularly benzene, in the presence of a fixed bed catalyst preferably comprising nickel on an inert carrier, for example alumina or silica agglomerates.

Many processes are known for hydrogenating hydrocarbons, particularly benzene.

These are carried out either in liquid or mixed liquid-vapor phase, or in vapor phase, in the presence of a fixed bed of catalyst or a dispersed catalyst.

Other processes combine several of these steps, for example they operate in 2 steps.

These processes are not entirely satisfactory for various reasons, for example they give a naphthenic hydrocarbon of insufficient purity or they are costly due to high operating costs or investments.

In view of the importance of this reaction, any improvement over the known processes is of major interest.

The main object of this invention is to describe a new process of hydrogenation of aromatic hydrocarbons, particularly benzene, which provides for chemical, technological and economic advantages.

The new process comprises using at least 2 hydrogenation zones, the whole of the aromatic hydrocarbon being introduced into the first zone in the form of an essentially liquid mixture comprising this aromatic hydrocarbon and a recycle liquid feed such as hereinater defined, molecular hydrogen being also introduced into this first zone further containing a hydrogenation catalyst in fixed bed, the effluent from the first zone being cooled to such an extent that 30 to 75% and preferably 45 to 55% by weight of the hydrocarbon vapors contained therein condense, the resulting liquid and vapor phase being separated, at least a part of the liquid phase being recycled to the inlet of the first zone as recycle liquid feed, at least a part of the vapor phase being passed through the second and optionally subsequent hydrogenation zones in which the hydrogenation is carried out in gas phase in the presence of a fixed bed of hydrogenation catalyst, with the provision that no substantial portion of the condensed effluent from the second or subsequent zone is recycled to the inlet of the first zone.

By comparison with conventional processes in which, for example, the effluent of the first zone is substantially completely cooled down to the room temperature, the present invention exhibits the following advantages:

A higher overall yield of the hydrogenation, also resulting into a noticeable reduction of the content of aromatic hydrocarbon of the obtained naphthenic hydrocarbon, A lower power consumption to heat the feed charge with respect to conventional processes; the liquid phase recycled to the inlet of the first stage reactor being at a relatively high temperature, no additional supply of heat is necessary. In the same way, the uncondensed vapors at the outlet of the first zone are directly hydrogenated in the second zone without intermediary heating.

A reduction of the investment costs due to a substantial reduction of the size of the exchange or of the number of the same.

A partial condensation of the vapors of the naphthenic hydrocarbon results in an increase of the hydrogen concentration in the vicinity of the catalyst of the second or subsequent step and permits the completion of the reaction without need of fresh hydrogen, which results in a reduced consumption of hydrogen with respect to known processes.

The operating conditions are not critical and can be taken in the conventional ranges. For example the pressure is between 10 and and 70 kg./cm.$^2$, the temperature between 140 and 300° C. and preferably between 160 and 220° C., the hydrogenating gas being either pure hydrogen or a gaseous mixture containing hydrogen as well as inert gases such as nitrogen or methane.

The catalyst usually comprises a carrier impregnated with a metal of the VIIIth group of the Periodic Chart. As preferred metals, nickel, platinum, palladium and iron may be mentioned.

A large number of porous carriers may be used, for example alumina, silica, magnesia, kieselguhr, diatomaceous earth and mixtures thereof. However the preferred catalyst is nickel on alumina or silica.

The temperature at which is carried out the partial condensation of the vapors is obviously dependent on the temperature and pressure prevailing in the first hydrogenation zone and most usually in the range of 140 to 200° C., preferably between 160 and 180° C.

The accompanying drawing describes a particular embodiment of this invention.

EXAMPLE 1

This example relates to the hydrogenation of benzene to cyclohexane.

A hydrogen-containing gas is introduced through pipe 1 into reactor 2 containing three beds of catalyst consisting of nickel (7% by weight) on alumina (93% by weight).

Liquid benzene is admitted through pipe 3 at room temperature. This is diluted in the recycle liquid of pipe 4, issuing from reactor 2.

This recycle liquid consists essentially of cyclohexane at about 180° C. The resulting liquid mixture, introduced into the reactor, contains about 12% by weight of benzene (the usual range is from 5 to 30%) at about 160° C. and 28 kg./cm.$^2$. The major part of benzene is hydrogenated in reactor 2 since the conversion rate is higher than 99%, for example 99.5% or 99.9% (in the present example: 99.6%.

The reaction heat results in an increase of the temperature of the hydrocarbons in the bed as well as a vaporization of a part of these hydrocarbons, the liquid-gas mixture issuing from the reactor at about 220° C.

The effluent is passed through pipe 5 to the cooler 6 in which a part of the hydrocarbon vapors is condensed, 50% in the present case. The recovered heat may be advantageously used to produce steam.

The effluent from cooler 6, at a temperature of about 180° C., is flowed through pipe 7 to the separator 8 from which is recovered, at the bottom, a liquid which is recycled directly through pipe 9, pump 10 and pipe 4 to reactor 2. As shown before, this liquid consists essentially of cyclohexane and will dilute and reheat benzene of pipe 3. Benzene of pipe 3 may be reheated if desired, but this is usually useless for the above-given reason.

The remaining vapors, consisting essentially of cyclohexanes with a low amount of benzene and the unconverted hydrogen, are conveyed through pipe 11 in a finishing reactor 12 in which the remaining benzene is hydrogenated. This reactor also contains a bed of catalyst of the same type as that of the first reactor, and works substantially under the same conditions of temperature and pressure as those of the first reactor, although this is not necessary.

As easily noticeable, the hydrocarbon vapors issuing from separator 8 pass directly into the second reactor without interemediary heating and also without addition of fresh hydrogen. This is one of the advantages of this invention. It is also possible, although not necessary, to add hydrogen and/or preheat the resulting mixture at this stage.

In the particular embodiment shown on the accompanying design, the rate of feed of hydrocarbon vapors in pipe 11 is substantially the molar equivalent of the rate of feed of benzene from pipe 3 since the liquid from the separator 8 is recycled through line 4 (this is only true when the equilibrium is attained).

The effluent from the finishing reactor passing in pipe 13 is cooled down to room temperature, for example 30° C., in the heat exchanger 14, and then passed through pipe 15 to separator 16.

At this stage, the uncondensable gases such as nitrogen, methane and excess hydrogen are rejected through pipe 20. This gaseous feed may be recycled at any stage of the process as hydrogen feed if the initial hydrogen of line 1 is sufficiently pure. Raw cyclohexane is passed through pipe 17 and then stabilized in unit 18 where the dissolved gases are removed. Even after 2000 hours of run, cyclohexane containing 12 parts per million by weight of benzene is obtained in pipe 19.

It is noticeable that, in this process, the whole of the aromatic hydrocarbon is introduced at the inlet of the first zone and not at all between the first and second zones.

EXAMPLE 2

In a unit such as shown in the drawing, toluene has been hydrogenated to methylcyclohexane. The operating conditions were substantially those of Example 1.

This results in methylcyclohexane containing 26 parts per million by weight of toluene.

What is claimed as this invention is:

1. A process for manufacturing a naphthenic hydrocarbon selected from the group consisting of cyclohexane and methylcyclohexane by hydrogenation of an aromatic hydrocarbon selected from the group consisting of benzene and toluene,
   said process comprising introducing all of the aromatic hydrocarbon into first zone in the form of a liquid mixture containing:
   (a) said aromatic hydrocarbon and
   (b) a recycle liquid fraction of the products resulting from the first hydrogenation zone; passing molecular hydrogen into said first zone and conducting the hydrogenation in said first zone at between 140 and 300° C. and at a pressure of between 10 and 70 kg./cm.$^2$ in contact with a fixed bed hydrogenation catalyst;
      cooling resultant gaseous effluent from said first zone to a temperature between 140 and 200° C. to condense 30 to 75% by weight of the hydrocarbon vapors contained therein;
   separating the resulting liquid and vapor phases;
   recycling at least a part of said resulting liquid phase to said first zone as said recycle liquid fraction; and passing at least a part of said resulting vapor phase through a following second hydrogenation zone and conducting the hydrogenation in said second zone in the gas phase at a temperature between 140 and 300° C. and at a pressure between 10 and 70 kg./cm.$^2$, in contact with a fixed bed of hydrogenation catalyst.

2. A process according to claim 1, wherein the aromatic hydrocarbon is converted to more than 99% in said first zone.

3. A process according to claim 1, wherein 45 to 55% by weight of the vapors in the effluent from the first zone are condensed.

4. A process according to claim 1, wherein the hydrogenation catalyst consists of porous carrier containing a metal of Group VIII of the Periodic Chart.

5. A process according to claim 4, wherein the metal is nickel.

6. A process according to claim 1 wherein said aromatic hydrocarbon is benzene and the naphthenic hydrocarbon is cyclohexane.

7. A process according to claim 1 wherein said aromatic hydrocarbon is toluene and said naphthenic hydrocarbon is methylcyclohexane.

References Cited

UNITED STATES PATENTS

| | | | |
|---|---|---|---|
| 2,755,317 | 7/1956 | Kassel | 260—667 |
| 3,202,723 | 8/1965 | Thonon | 260—667 |
| 3,505,421 | 4/1970 | Lumbroso et al. | 260—667 |
| 3,428,696 | 2/1969 | Hallman | 260—667 |

DELBERT E. GANTZ, Primary Examiner

V. O'KEEFE, Assistant Examiner